(12) United States Patent
Chatterjee et al.

(10) Patent No.: US 8,370,597 B1
(45) Date of Patent: Feb. 5, 2013

(54) DATA MIGRATION BETWEEN MULTIPLE TIERS IN A STORAGE SYSTEM USING AGE AND FREQUENCY STATISTICS

(75) Inventors: Paresh Chatterjee, Fremont, CA (US);
Ajit Narayanan, Chennai (IN);
Loganathan Ranganathan, Fremont, CA (US); Sharon Enoch, Newark, CA (US)

(73) Assignee: American Megatrends, Inc., Norcross, GA (US)

( * ) Notice: Subject to any disclaimer, the term of this patent is extended or adjusted under 35 U.S.C. 154(b) by 802 days.

(21) Appl. No.: 12/101,236

(22) Filed: Apr. 11, 2008

Related U.S. Application Data

(60) Provisional application No. 60/923,492, filed on Apr. 13, 2007.

(51) Int. Cl.
  *G06F 12/00* (2006.01)
  *G06F 13/00* (2006.01)
  *G06F 13/28* (2006.01)
  *G06F 17/00* (2006.01)
  *G06F 7/00* (2006.01)
  *G06F 17/30* (2006.01)

(52) U.S. Cl. ........ 711/170; 711/100; 711/112; 711/113; 711/114; 711/117; 711/133; 711/145; 711/147; 711/148; 711/154; 711/158; 711/159; 711/160; 707/727; 707/651

(58) Field of Classification Search .................. None
See application file for complete search history.

(56) References Cited

U.S. PATENT DOCUMENTS

| | | | |
|---|---|---|---|
| 4,942,579 A | 7/1990 | Goodlander et al. | |
| 5,257,367 A | 10/1993 | Goodlander et al. | |
| 5,720,027 A | 2/1998 | Sarkozy et al. | |
| 5,732,238 A | 3/1998 | Sarkozy | |
| 5,787,459 A | 7/1998 | Stallmo et al. | |
| 5,790,774 A | 8/1998 | Sarkozy | |
| 5,893,919 A | 4/1999 | Sarkozy et al. | |
| 5,974,426 A | 10/1999 | Lee et al. | |
| 6,098,128 A | 8/2000 | Velez-McCaskey et al. | |
| 6,275,898 B1 | 8/2001 | DeKoning | |
| 6,327,638 B1 | 12/2001 | Kirby | |
| 6,484,235 B1 | 11/2002 | Horst et al. | |
| 6,718,436 B2 | 4/2004 | Kim et al. | |
| 6,901,479 B2 | 5/2005 | Tomita | |

(Continued)

OTHER PUBLICATIONS

U.S. Appl. No. 11/417,801, filed May 4, 2006, entitled "Method, System, and Apparatus for Expanding Storage Capacity in a Data Storage System", Inventors: Chatterjee et al.

(Continued)

*Primary Examiner* — Sanjiv Shah
*Assistant Examiner* — Marwan Ayash
(74) *Attorney, Agent, or Firm* — Meunier Carlin & Curfman, LLC

(57) ABSTRACT

Technologies are described for implementing a migration mechanism in a storage system containing multiple tiers of storage with each tier having different cost and performance parameters. Access statistics can be collected for each territory, or storage entity, within the storage system. Data that is accessed more frequently can be migrated toward higher performance storage tiers while data that is accessed less frequently can be migrated towards lower performance storage tiers. The placement of data may be governed first by the promotion of territories with higher access frequency to higher tiers. Secondly, data migration may be governed by demoting territories to lower tiers to create room for the promotion of more eligible territories from the next lower tier. In instances where space is not available on the next lower tier, further demotion may take place to an even lower tier in order to make space for the first demotion.

16 Claims, 11 Drawing Sheets

U.S. PATENT DOCUMENTS

| | | | |
|---|---|---|---|
| 7,360,051 | B2 | 4/2008 | Sugino et al. |
| 7,404,102 | B2 | 7/2008 | Soran et al. |
| 7,536,529 | B1 | 5/2009 | Chatterjee et al. |
| 7,562,200 | B1 | 7/2009 | Chatterjee et al. |
| 7,730,531 | B2 | 6/2010 | Walsh |
| 2002/0161983 | A1 | 10/2002 | Milos et al. |
| 2003/0163630 | A1 | 8/2003 | Aasheim et al. |
| 2005/0165925 | A1 | 7/2005 | Dan et al. |
| 2005/0188075 | A1 | 8/2005 | Dias et al. |
| 2006/0031648 | A1 | 2/2006 | Ishikawa et al. |
| 2006/0031649 | A1 | 2/2006 | Murotani et al. |
| 2006/0107013 | A1 | 5/2006 | Ripberger |
| 2006/0130042 | A1 | 6/2006 | Dias et al. |
| 2006/0243056 | A1 | 11/2006 | Sundermeyer et al. |
| 2007/0239747 | A1* | 10/2007 | Pepper .................... 707/101 |
| 2008/0104343 | A1* | 5/2008 | Miyagaki et al. ........... 711/158 |
| 2008/0320247 | A1* | 12/2008 | Morfey et al. ............. 711/154 |
| 2009/0070541 | A1 | 3/2009 | Yochai |

OTHER PUBLICATIONS

U.S. Appl. No. 11/254,347, filed Oct. 20, 2005, entitled "Method, System, Apparatus, and Computer-Readable Medium for Provisioning Space in a Data Storage System," Inventors: Chatterjee et al.

U.S. Official Action dated Sep. 4, 2007 in U.S. Appl. No. 11/254,347.

U.S. Official Action dated Mar. 18, 2008 in U.S. Appl. No. 11/254,347.

U.S. Patent Application No. 12/101,238, filed Apr. 11, 2008, entitled "Data Migration Between Multiple Tiers in a Storage System Using Pivot Tables," Inventors: Chatterjee et al.

U.S. Notice of Allowance / Allowability dated Jan. 12, 2009 in U.S. Appl. No. 11/254,347.

U.S. Official Action dated Oct. 8, 2008 in U.S. Appl. No. 11/254,347.

U.S. Official Action dated Mar. 30, 2009 in U.S. Appl. No. 11,417,801.

U.S. Official Action dated Jul. 8, 2009 in U.S. Appl. No. 11/417,801.

U.S. Appl. No. 12/425,123, filed Apr. 16, 2009 entitled "Provisioning Space in a Data Storage System", Inventors: Chatterjee et al.

U.S. Official Action dated Jan. 25, 2011 in U.S. Appl. No. 12/101,251.

Burtscher, Martin et al., "Prediction Outcome History-based Confidence Estimation for Load Value Prediction," Department of Computer Science, University of Colorado, Journal of Instruction-Level Parallelism 1, May 1999, pp. 1-25.

U.S. Official Action dated Dec. 2, 2010 in U.S. Appl. No. 12/104,123.

U.S. Official Action dated Jan. 21, 2011 in U.S. Appl. No. 12/101,241.

U.S. Official Action, dated Dec. 9, 2011, received in connection with related U.S. Appl. No. 13/214,432.

U.S. Official Action dated Apr. 14, 2011, received in connection with related with U.S. Appl. No. 12/104,135.

\* cited by examiner

DATA MIGRATION BETWEEN MULTIPLE TIERS IN A STORAGE SYSTEM USING AGE AND FREQUENCY STATISTICS

CROSS-REFERENCE TO RELATED APPLICATIONS

This application claims the benefit of U.S. provisional patent application No. 60/923,492, filed on Apr. 13, 2007, and entitled "A Novel Method of Choosing Data to Migrate Between Multiple Tiers in a Storage System Using Age and Frequency Statistics" which is expressly incorporated herein by reference in its entirety.

BACKGROUND

A virtualized cluster is a cluster of different storage nodes that together expose a single storage device. Input/output (I/O) operations sent to the cluster are internally re-routed to read and write data to the appropriate locations. In this regard, a virtualized cluster of storage nodes can be considered analogous to collection of disks in a Redundant Array of Inexpensive Disks (RAID) configuration, since a virtualized cluster hides the internal details of the cluster's operation from initiators and presents a unified device instead.

In a virtualized cluster, which may have huge amounts of storage, the drives and RAID arrays constituting the storage hardware may not be homogeneous. A combination of less expensive, slower drives and more expensive, faster drives are often used together to achieve a desired mix of performance and price. Such a homogeneous storage system consists, therefore, of a plurality of sets of physical disks or logical disks, each set having different cost and performance parameters. Determining how the data being stored in the system should best be distributed among the various drives presents an interesting challenge. Generally, two major considerations play into making such a determination. These considerations are performance maximization and utilization maximization of the most costly resources.

Just as the disk and logical disk components of a storage system may not be homogeneous, data accesses in the system may not be homogeneous. Generally, certain data may be accessed very frequently while other data may be hardly ever accessed. Moreover, some data may have been accessed frequently at some point in time, but has recently been accessed less frequently. It is typically desirable to host data that is accessed more frequently on the higher cost, higher performance storage devices. Conversely, data that is less frequently accessed may be relegated to the lower cost, lower performance storage devices. Such an arrangement may provide a storage system that puts the most costly resources to their highest and best use.

Migrating blocks of stored data to different storage areas over time can assist with placing the most used data on the highest performance storage components. Determining which data should be migrated to what storage areas and at what time can provide a difficult optimization challenge. This challenge is further complicated by the fact that data access patterns may change over time and are generally not static.

It is with respect to these considerations and others that the disclosure made herein is presented.

SUMMARY

Technologies are described herein for implementing a migration mechanism in a storage system containing multiple tiers of storage with each tier having different cost and performance parameters. Through the utilization of the technologies and concepts presented herein, data that is accessed more frequently can be migrated toward higher cost, higher performance storage tiers while data that is accessed less frequently can be migrated towards lower cost, lower performance storage tiers. A dynamic, adaptive approach can provide a highly optimized arrangement of data. Such an approach can also attempt to maintain efficient data arrangements amongst the tiers of the storage system even under changing data access conditions. The capacity within a storage system can be partitioned into sets, each set having different cost and performance parameters. These sets can be referred to as the tiers of the storage system. A storage system with more than one tier can be referred to as tiered storage.

According to one embodiment presented herein, Information Lifecycle Management (ILM) statistics can be collected for each segment, or storage entity, within the storage system. Storage entities may be territories, files, blocks, sectors, tracks, stripes, or any other data storage subdivision. For example, the entire storage space in the system may be divided up into multiple segments called territories. Examples of ILM statistics that can be maintained for each territory may include frequency of access and age, or time since last access.

According to another embodiment, techniques for combining frequency and age statistics into a single ILM metric may be used to simplify other aspects of the data migration system. The ILM metric can be a single, signed number, with positive numbers representing frequency and negative numbers representing age. These metrics may be analyzed periodically to determine which data migration moves should be made in order to optimally place data within the storage system.

According to yet another embodiment, the placement of data may be governed first by the promotion of territories with higher access frequency to higher tiers. Secondly, data migration may be governed by demoting territories to lower tiers to create room for the promotion of more eligible territories from the next lower tier. In instances where space is not available on the next lower tier, further demotion may take place from that tier to an even lower tier in order to make space for the previously discussed demotion. In this manner, the data may be optimally arranged for improved performance, and the system can also respond to dynamically changing patterns in data access.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
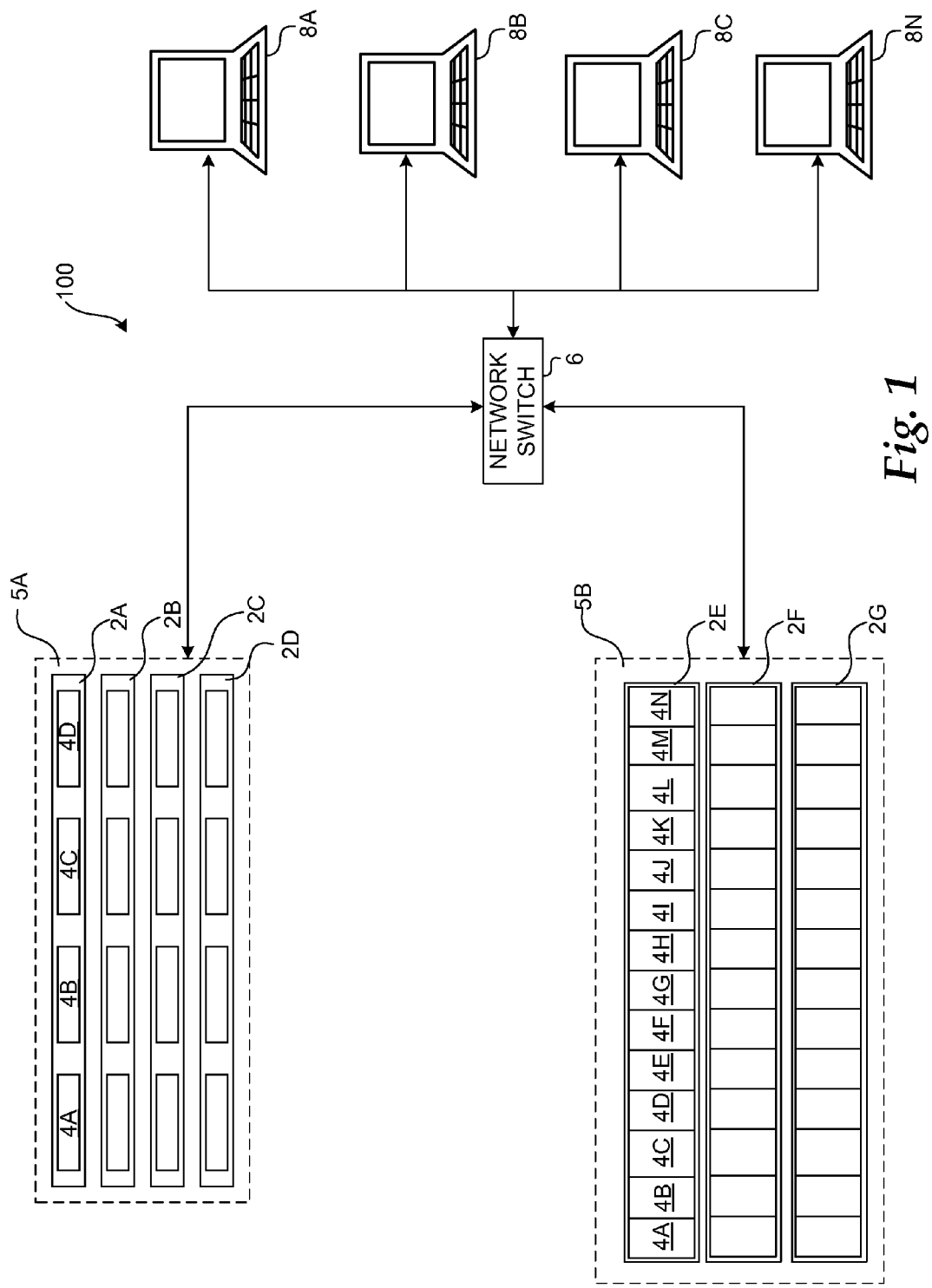
FIG. 1 is a network architecture diagram illustrating aspects of a storage system that includes several virtualized clusters according to one exemplary embodiment.

The following detailed description is directed to implementing data migration in a multitier storage system using age and frequency statistics. Through the use of the embodiments presented herein, data that is accessed more frequently can be migrated toward higher cost, higher performance storage tiers while data that is accessed less frequently can be migrated towards lower cost, lower performance storage tiers. A dynamic, adaptive approach can maintain efficient data arrangements amongst the tiers of the storage system even under changing data access conditions.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for implementing data migration in a multitier storage system using age and frequency statistics will be described.

Turning now to FIG. 1, details will be provided regarding an illustrative operating environment for the implementations presented herein, as well as aspects of several software components that provide the functionality described herein for implementing data migration in a multitier storage system using age and frequency statistics. In particular, FIG. 1 is a network architecture diagram showing aspects of a storage system 100 that includes several virtualized clusters 5A-5B. A virtualized cluster is a cluster of different storage nodes that together expose a single storage device. In the example storage system 100 shown in FIG. 1, the clusters 5A-5B include the storage server computers 2A-2G (also referred to herein as "storage nodes" or a "node") that are operative to read and write data to one or more mass storage devices, such as hard disk drives. The cluster 5A includes the nodes 2A-2D and the cluster 5B includes the nodes 2E-2G. All of the nodes 2 in a cluster 5 can be physically housed in the same rack, located in the same building, or distributed over geographically diverse locations, such as various buildings, cities, or countries.

According to implementations, the nodes within a cluster may be housed in a one rack space unit storing up to four hard disk drives. For instance, the node 2A is a one rack space computing system that includes four hard disk drives 4A-4D. Alternatively, each node may be housed in a three rack space unit storing up to fifteen hard disk drives. For instance, the node 2E includes fourteen hard disk drives 4A-4N. Other types of enclosures may also be utilized that occupy more or fewer rack units and that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to field I/O operations independently, but are exposed to the initiator of the I/O operation as a single device. It should be appreciated that a storage cluster may include any number of storage nodes. A virtualized cluster in which each node contains an independent processing unit, and in which each node can field I/Os independently (and route them according to the cluster layout) is called a horizontally virtualized or peer cluster. A cluster in which each node provides storage but the processing and mapping is done completely or primarily in a single node, is called a vertically virtualized cluster.

Data may be striped across the nodes of each storage cluster. For instance, the cluster 5A may stripe data across the storage nodes 2A, 2B, 2C, and 2D. The cluster 5B may similarly stripe data across the storage nodes 2E, 2F, and 2G. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance.

According to embodiments, each storage server computer 2A-2G includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which each storage server computer 2A-2G is a part. Through the use of the network ports and other appropriate network cabling and equipment, each node within a cluster is communicatively connected to the other nodes within the cluster. Many different types and number of connections may be made between the nodes of each cluster. Furthermore, each of the storage server computers 2A-2G need not be connected to the same switch 6. The storage server computers 2A-2G can be interconnected by any type of network or communication links, such as a LAN, a WAN, a MAN, a fiber ring, a fiber star, wireless, optical, satellite, or any other network technology, topology, protocol, or combination thereof.

Each cluster 5A-5B is also connected to a network switch 6. The network switch 6 is connected to one or more client computers 8A-8N (also referred to herein as "initiators"). It should be appreciated that other types of networking topologies may be utilized to interconnect the clients and the clusters 5A-5B. It should also be appreciated that the initiators 8A-8N may be connected to the same local area network ("LAN") as the clusters 5A-5B or may be connected to the clusters 5A-5B via a distributed wide area network, such as the Internet. An appropriate protocol, such as the Internet Small Computer Systems Interface ("iSCSI") protocol may be utilized to enable the initiators 8A-8D to communicate with and utilize the various functions of the storage clusters 5A-5B over a wide area network such as the Internet.

Two or more disks 4 within each cluster 5A-5B or across clusters 5A-5B may be mirrored for data redundancy and protection against failure of one, or more, of the disks 4. Examples of the disks 4 may include hard drives, spinning disks, stationary media, non-volatile memories, or optically scanned media; each, or in combination, employing magnetic, capacitive, optical, semiconductor, electrical, quantum, dynamic, static, or any other data storage technology. The disks 4 may use IDE, ATA, SATA, PATA, SCSI, USB, PCI, Firewire, or any other bus, link, connection, protocol, network, controller, or combination thereof for I/O transfers.

Figure 2:
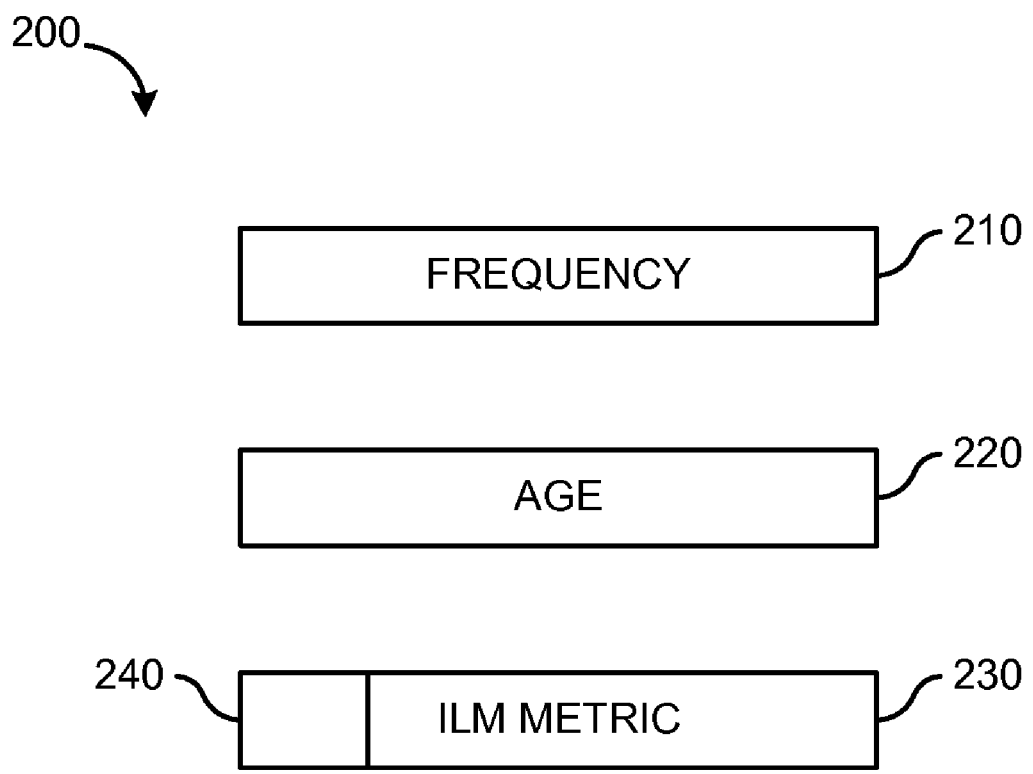
FIG. 2 is a data structure diagram illustrating ILM statistics variables according to one exemplary embodiment.

Referring now to FIG. 2, a data structure diagram 200 illustrates ILM statistics variables according to one exemplary embodiment. To determine how frequently a territory is accessed, a frequency statistic 210 can be maintained. If a territory was accessed during the last update period, the frequency statistic 210 can be incremented each time the territory is accessed. At the end of an update period, the frequency statistic 210 can represent the number of accesses during that update period. A second ILM statistic may be an age statistic 220. If a territory was not accessed during the last update period, the age statistic 220 may be incremented to indicate that is has been a longer time since the territory was accessed. Although storage entities of territories are discussed, a storage entity may be a file, block, sector, stripe, provision, or any other subdivision of a physical storage device.

The update period may be any consistent amount of time. The update period may be established by a counter, clock, timer, timer interrupt, or any other time keeping mechanism. Such a mechanism can cause a process, module, or thread to update all of the ILM statistics once per update period. An example of an update period may be one hour, but other time durations can equally be used.

A combined single variable can be used as an ILM metric 230 which can represent both the frequency statistic 210 and the age statistic 220 within one value. The frequency statistic 210 and the age statistic 220 may be considered mutually exclusive since the frequency statistic 210 may be irrelevant for a territory with a higher age, and the age statistic 220 may be taken as zero, or nearly zero, for a frequently accessed territory. Thus only one of the frequency or the age needs to be stored for a given territory. The sign bit 240, or the most significant bit, of the ILM metric 230 variable may be used to indicate whether the ILM metric 230 is currently an age or a frequency. The ILM metric 230 can represent a signed value, which can be negative when it represents an age, and positive when it represents a frequency. A larger positive number can imply a higher frequency of access than a lower positive number, while a lower (or more negative) negative number can imply an older age then a smaller negative number, thus a consistent continuum across the positive and negative ILM metric 230 values can represent a consistent ordering. This order maps to both most recently and most frequently accessed territories having higher ILM metric 230 values.

An example of implementing the ILM metric 230 values may be to use a 16 bit word to store the ILM metric 230. To remove ambiguity, unused territories or newly initialized ILM metrics 230 may be given the unique value with all bits set high. This number will not be used in the normal age or frequency counting operations in order to maintain its unique meaning in an unambiguous manner. Other than this reserved identifier, the high bit (or sign bit) can be used to designate age or frequency such that ages are negative and frequencies are positive. The remaining fifteen bits are used to count the age and/or frequency accordingly.

Further detail will be discussed below to illustrate how ILM statistics 230 can be periodically updated. Also, the use of the combined ILM statistics 230 to improve the efficiency of migration techniques is demonstrated below in additional detail.

Figure 3:
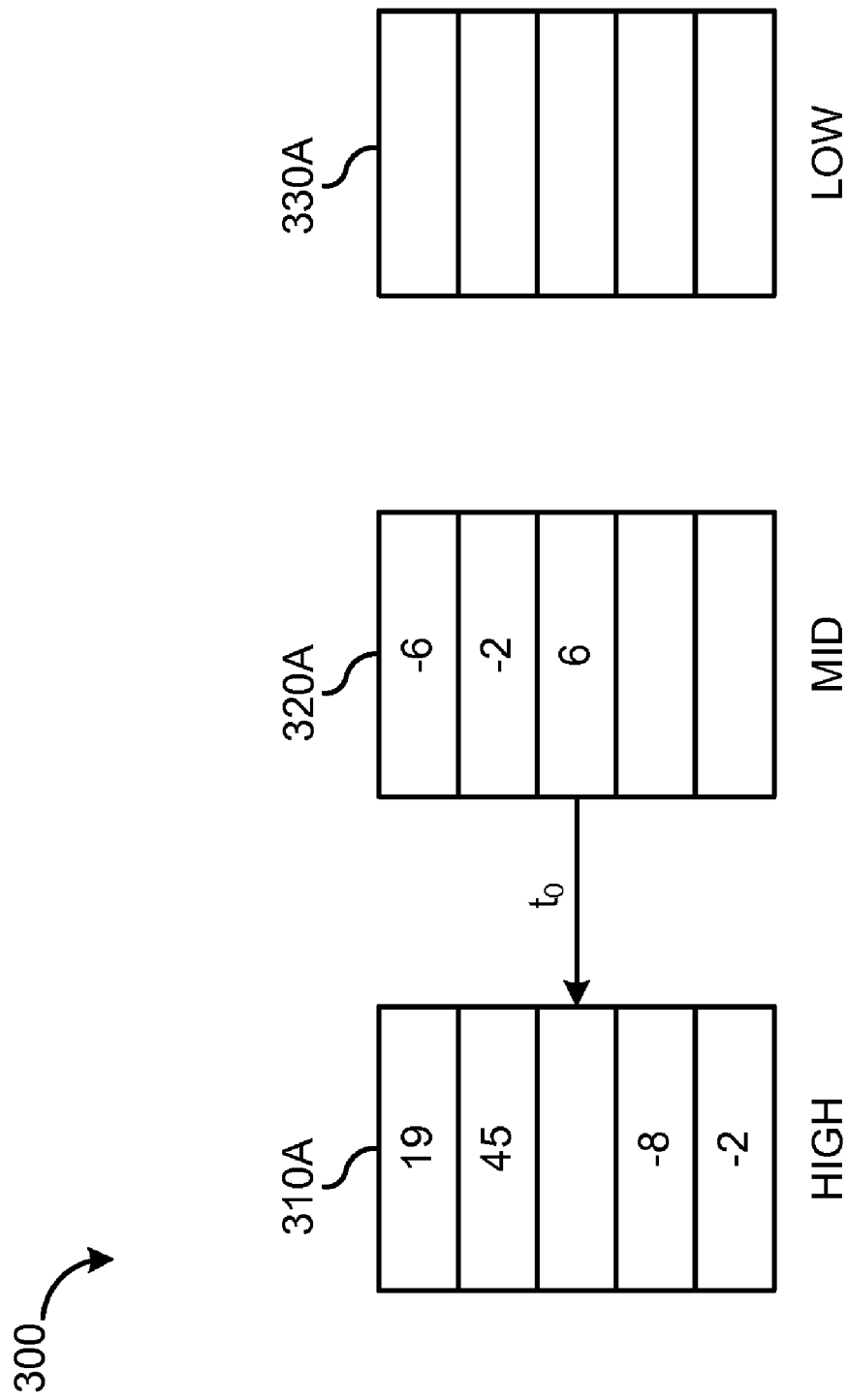
FIG. 3 is a data structure diagram illustrating a first phase of data migrations according to one exemplary embodiment.

Referring now to FIG. 3, a data structure diagram 300 illustrates a first phase of data migrations. A storage system can comprise three tiers, a high-performance tier 310A, a middle tier 320A, and a low-performance tier 330A. Each tier can have a corresponding array, list, or other data structure where each element of the data structure can store an ILM metric corresponding to each territory or similar data storage subdivision.

The subdivisions of a tier may be territories of the storage system. While smaller territories may provide a finer granularity of statistics, larger territories may provide a reduced memory/storage footprint for the statistics being collected. A tradeoff between these two constraints may yield an optimal territory size for different applications or systems. For example, one embodiment may use a territory size of eight megabytes.

Placement of data in the tiers may be driven by the following criteria, in order of highest priority first. The first priority can relate to the highest utilization of the high-performance tier. All data can be given the opportunity to reside on high-performance storage if space is available. Since a greater amount of money may have been invested in the purchase of the high-performance storage, it can be a waste of resources to leave portions of the higher tiers idle. The second priority can relate to utilization of high-performance storage for data that may be accessed more frequently. If there is contention for high-performance storage, the most frequently accessed data can be given priority for the high-performance storage. The third priority can relate to utilization of low-performance storage for data that may be accessed less frequently. If less frequently accessed data is occupying high-performance storage, it can be moved to a lower performance tier in order to free up space in the high-performance tier for more frequently accessed data. While an example data migration scheme can be expressed as three migration phases and in the context of three storage priorities, the scheme can be partitioned into more or fewer phases without departing from the spirit or scope of the technologies discussed herein.

From the three priorities, certain corollaries may result. First, new data, or storage allocations, can be automatically placed on the highest available tier. That is, when a new write arrives to the system, it can automatically be routed to the highest available tier. Second, if there is space available on a high-performance tier, the most eligible candidate territory from a lower tier can be moved to the higher tier. Third, if there is no space available on a high-performance tier, but there are candidate territories on lower tiers that are more eligible to reside on the higher tier than the territories currently residing on the higher tier, the most ineligible territories can be demoted out of the higher tier and into a lower tier. This demotion may make space for the promotions of more eligible territories into the higher tier.

For simplicity, movement of territories may be restricted to only occur between adjacent tiers. For example, in a storage system with three tiers (high, middle, and low) movement may only be allowed to occur from the high tier to the middle tier, from the middle tier to either the low tier or the high tier, and from the low tier to the middle tier. Of course the data migration system can be implemented without such a single-hop restriction, but additional complexity may result.

Data migration processes may include the following operations. Data having the highest access frequencies, along with all newly arriving data, can be stored in the tier with the highest performance that has free territories. If a higher tier is nearly full, and is found to have elements that are less eligible than elements in a lower tier, these less eligible elements can be demoted to a lower tier to create space for the more eligible territories to be promoted. When space is not available for such demotion to the lower tier, the least eligible data in the lower tier can be demoted to an even lower tier in anticipation of the eventual promotion of more eligible data to the higher tier. In the steady state, the entire amount of stored data can be striped across multiple tiers so that the highest performance tiers have the most frequently accessed data, the lower tiers have the least accessed data, and utilization of the costliest resources is substantially maximized.

In the example illustrated in FIG. 3, the third territory of the middle tier 320A has the highest ILM metric of the tier with a frequency of six. As such, that territory can be migrated to the empty space in the high tier 310A. Since the target territory is empty, the promotion can be made immediately, or in time t_zero. Promoting the most eligible territory into free space in a higher tier is an example of priority one data migrations.

Migrating data can involve copying all of the data from the source territory to the target territory in a different tier. The ILM statistics in the tier data structures must also be migrated to correspond to the new location of the migrated territory.

As one example, a storage system may have three tiers where the top tier comprises high-performance SAS (serially attached SCSI) drives; the middle tier comprises slower SATA (serial advanced technology attachment) drives with a high-performance RAID system; and the low tier comprises SATA drives with a slower RAID system. Factors in determining the tiers may include drive rotation speed, head seek latency, drive interface performance, caching, RAID performance, drive capacity, network connection speed, network stack performance, and various other system parameters.

Figure 4:
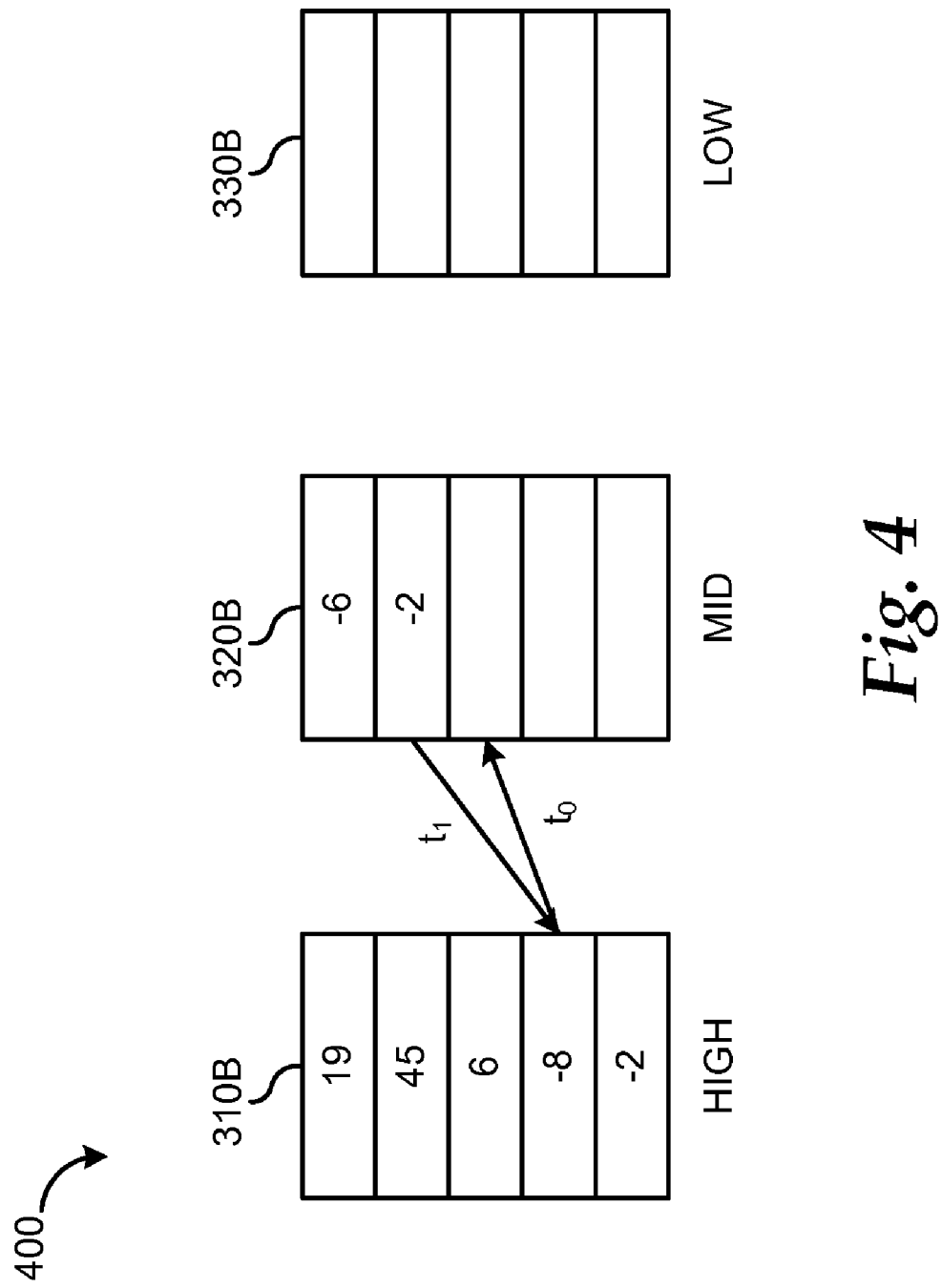
FIG. 4 is a data structure diagram illustrating a second phase of data migrations according to one exemplary embodiment.

Referring now to FIG. 4, a data structure diagram 400 illustrates a second phase of data migrations. A storage system can comprise three tiers, a high-performance tier 310B, a middle tier 320B, and a low-performance tier 330B. Three data structures can comprise elements that can each store an ILM metric corresponding to a subdivision, or territory, of the data store.

Data migrations can be based upon relative eligibility. For example, a territory in the high tier 310B having a lower ILM metric than the highest territory in the middle tier 320B may imply an eligibility gap or non-optimal arrangement of data. The highest territory of the middle tier 320B is the second territory and has an ILM metric of negative two. The fourth territory of the high tier 310B has an ILM metric of negative eight. Since negative two is greater than negative eight, the second territory of the middle tier 320B can be said to be more eligible to be in the high tier 310B. Likewise, the fourth territory of the high tier 310B, having the lower ILM metric of negative eight, can be said to be less eligible to be in the high tier 310B. If space permits, less eligible tiers can be demoted to the next lower tier. In this instance, the fourth territory of the high tier 310B having an ILM metric of negative eight can be demoted to the middle tier 320B. This can be done to support migrating more eligible data from the middle tier 320B into the space created by the demotion. In this case, it would open up a space in the high tier 310B into which the second territory of the middle tier 320B could be promoted. Such a demotion to clear space for promotions is an example of priority two data migrations.

Generally, demotions have to occur first. Preferably, they can occur immediately in time period t_zero. After space is made in the high tier 310B by the demotion, the corresponding promotion from the middle tier 320B may occur in the next time period or at time t_one. The time periods may be defined by periodic timed migration cycles within the storage system. Also, multiple migration phases or time cycles may occur within a single cycle of the migration period timer.

The demotions for priority two data migrations can be performed pair-wise between tiers. The demotions can start with the lowest two tiers so that space is created as less eligible territories are demoted down the hierarchy of tiers. The demotions can also start with the highest two tiers. Either way, the pairing of tiers for demotion can iterate pair-wise through the entire set of tiers. For example, the three tiers of the example system illustrated in FIG. 4 can have two iterations of paired tiers, high tier to middle tier, and middle tier to low tier.

The number of demotions may be limited to only the number required to make space for the promotion of more eligible territories. As such, the process of demotion and promotion can be considered a swapping of territories between two tiers. Hence, less eligible candidates in the higher tier can be matched up to the more eligible candidates in the lower tier. The number of territories to demote can be calculated as the minimum of three numbers: the number of less eligible candidates in the higher tier, the number of more eligible candidates in the lower tier, and the number of free space in the lower tier to support demotions from the higher tier.

Figure 5:
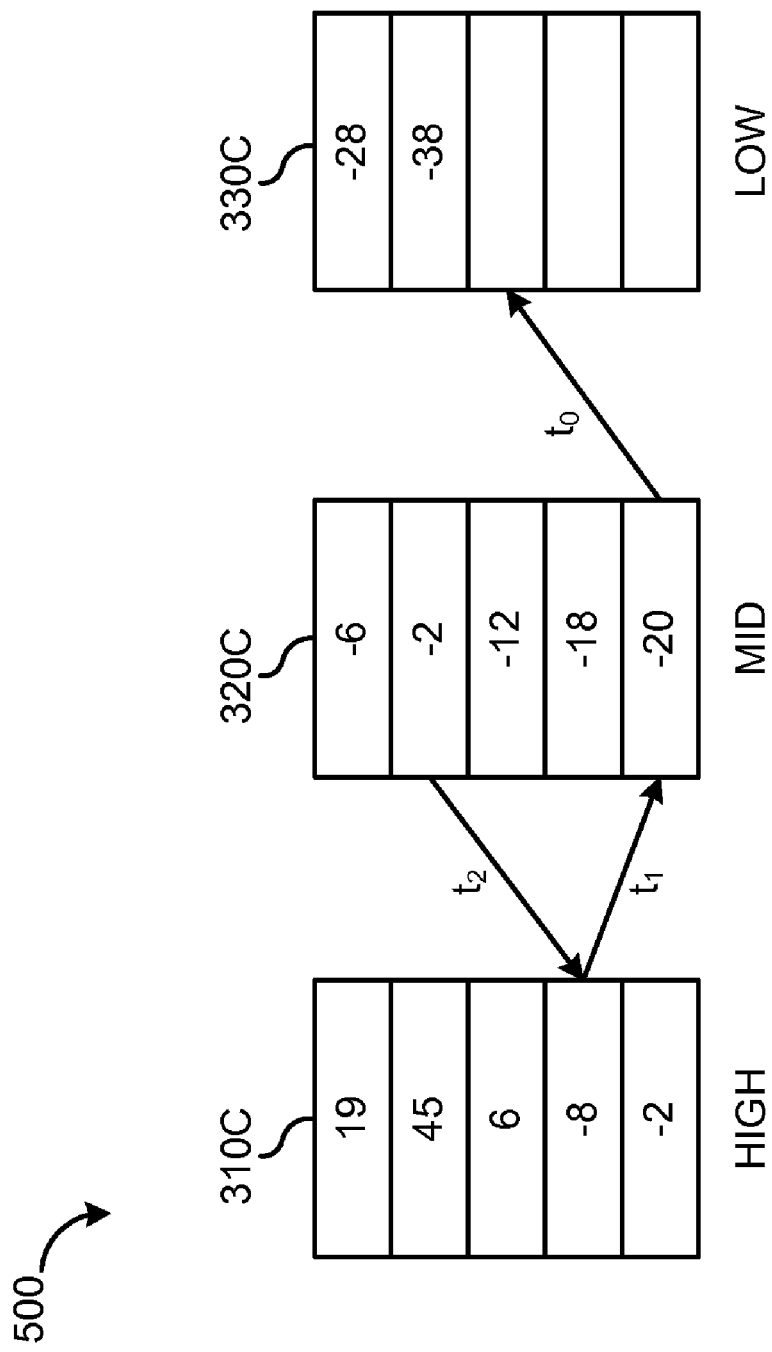
FIG. 5 is a data structure diagram illustrating a third phase of data migrations according to one exemplary embodiment.

Referring now to FIG. 5, a data structure diagram 500 illustrates a third phase of data migrations. A storage system can comprise three tiers, a high-performance tier 310C, a middle tier 320C, and a low-performance tier 330C. Three data structures can comprise elements that can each store an ILM metric corresponding to a subdivision, or territory, of the data store. Using the priority two data migration discussed above, the fourth territory of the high tier 310C may be demoted to make room for the second territory of the middle tier 320C to be promoted to the high tier 310C. This may be an optimizing migration because the second territory of the middle tier 320C has an ILM metric of negative two which is higher than the negative eight ILM metric of the fourth territory of the high tier 310C. Thus the second territory of the middle tier 320C can be said to be more eligible to be in the high tier 310C than the fourth territory of the high tier 310C. Unfortunately, if the middle tier 320C is full, then the demotion is blocked which then also prevents the promotion.

Creating a space on the middle tier 320C by demoting the lowest territory in the middle tier 320C can allow the demotion from the high tier 310C and subsequently the promotion from the middle tier 320C to take place. This can be an example of priority three data migration. The fifth territory of the middle tier 320C may be selected for demotion due to it having the lowest ILM metric of the tier at negative twenty. Since there is room on the low tier 330C, the fifth territory of the middle tier 320C can be immediately demoted into the low tier 330C. This can occur in time period t_zero. The space created by that demotion can then allow for the demotion of the fourth territory of the high tier 310C with an ILM metric of negative eight into the middle tier 320C. This second demotion can occur after time period t_zero, such as in time period t_one. The space created by that demotion can then allow for the promotion of the second territory of the middle tier 320C with an ILM metric of negative two into the high tier 310C. This promotion can occur after the two demotions, which can be in time period t_two if the second demotion occurred in time period t_one.

Priority three migrations can be considered to occur between trios, or triples, of consecutive tiers. The process can continue piece-wise across all tiers by advancing, by one tier at a time, the current trio of tiers to operate upon. The process can begin with the lowest three tiers as the current trio to allow for the creation of space as territories are demoted down the hierarchy of tiers. Also, the process can begin at the highest trio of tiers. The general progression can provide for determining when no space is available in the middle tier of the trio. In response, space can be created on the middle tier of the trio by demoting the least eligible tier of the middle tier of the trio to the lower tier of the trio. A territory from the upper tier of the trio can then be demoted into the space left behind on the middle tier of the trio. Finally, the most eligible territory in the middle tier of the trio can be promoted to the upper tier of the trio.

Figure 6:
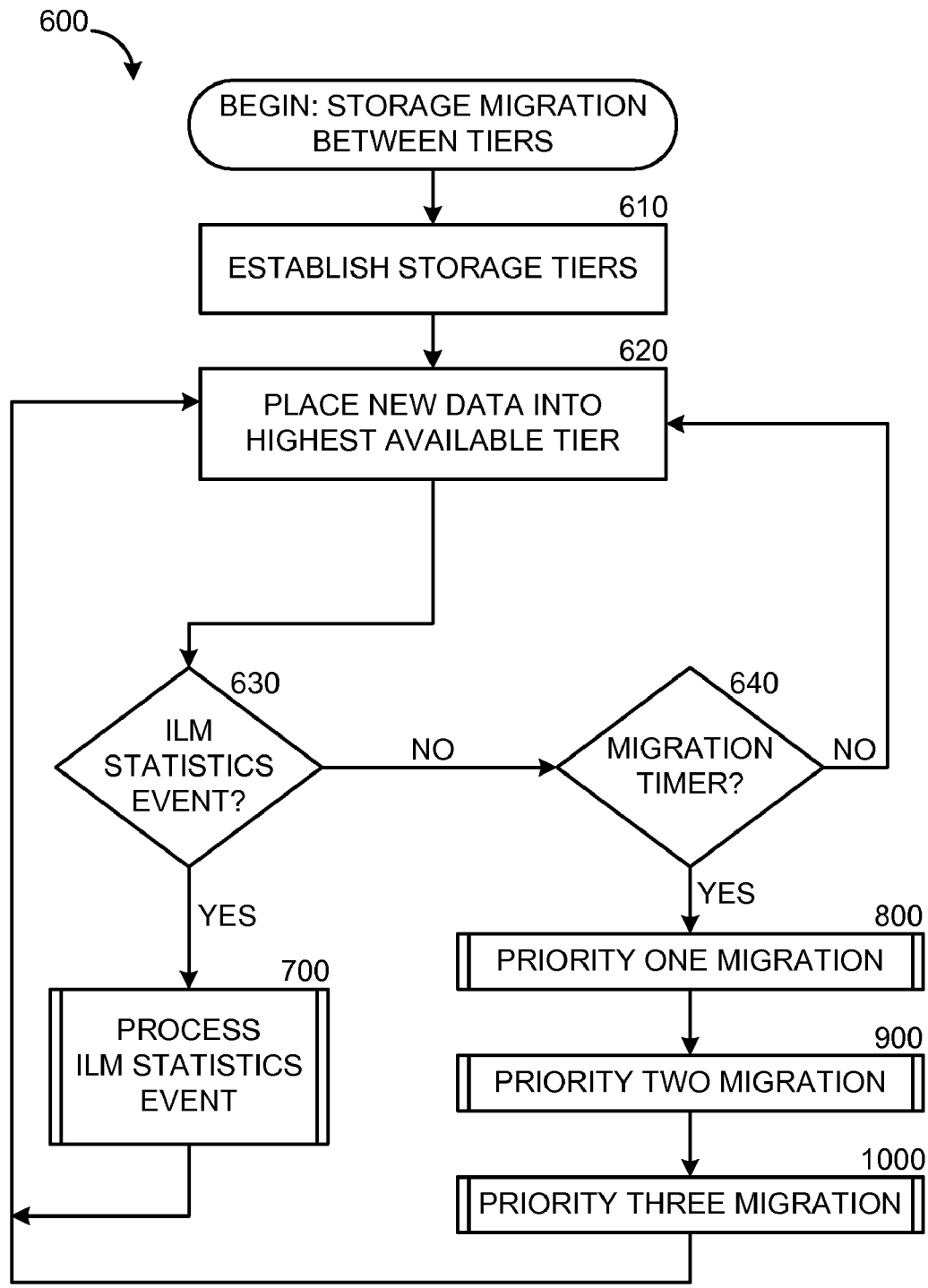
FIG. 6 is a logical flow diagram illustrating a process performed by a storage system for migrating data between storage tiers according to one exemplary embodiment.

Turning now to FIG. 6, additional details will be provided regarding the embodiments presented herein for data migration in a multitier storage system using age and frequency statistics. In particular, FIG. 6 is a flow diagram showing a routine 600 that illustrates aspects of an exemplary process performed by a storage system for migrating data between storage tiers. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 600 can begin with operation 610 where storage tiers can be established. Factors in determining the tiers can be related to the performance of the various storage devices in the system. These factors may include drive rotation speed, head seek latency, drive interface performance, caching, RAID performance, drive capacity, network connection speed, network stack performance, and various other parameters.

At operation 620, new data arriving to the storage system is placed into the highest available tier. Operation 620 may be included into a continuous main loop of the routine 600 so that at all times newly arriving data is placed into the highest tier with free space available.

At operation 630, it is evaluated if an ILM statistic event has occurred. If no ILM statistic even has occurred, the main loop of the routine 600 can continue to operation 640. If an ILM statistic event has occurred, the routine 600 can proceed to subroutine 700 to process the ILM statistic event. The ILM statistics event processing routine 700 is discussed in additional detail with respect to FIG. 7. After operation 700, the routine 600 can loop back to operation 620.

At operation 640, it is evaluated if a periodic migration timer event has occurred. If no migration time event has occurred, the main loop of the routine 600 can continue back to operation 620. If a migration time event has occurred, the routine 600 can continue to subroutine 800 where priority one data migrations can be performed, and then to subroutine 900 where priority two data migrations can be performed, and finally to subroutine 1000 where priority three data migrations can be performed. The data migration routines 800, 900, and 1000 are discussed in additional detail with respect to FIGS. 8, 9, and 10 respectively. After operation 1000, the routine 600 can loop back to operation 620.

Performing data migration may consume considerable computational, time, memory, or communications resources within the storage system. In order to limit this resource consumption, a quota or ceiling may be imposed on the number of data migrations than can occur per migration cycle or within a given period of time. This quota checking can prevent additional migrations past the limit from occurring. Such limiting may be imposed within routine 600. The limitations may also be checked and imposed within one or more of routine 700, 800, 900, or 1000.

Figure 7:
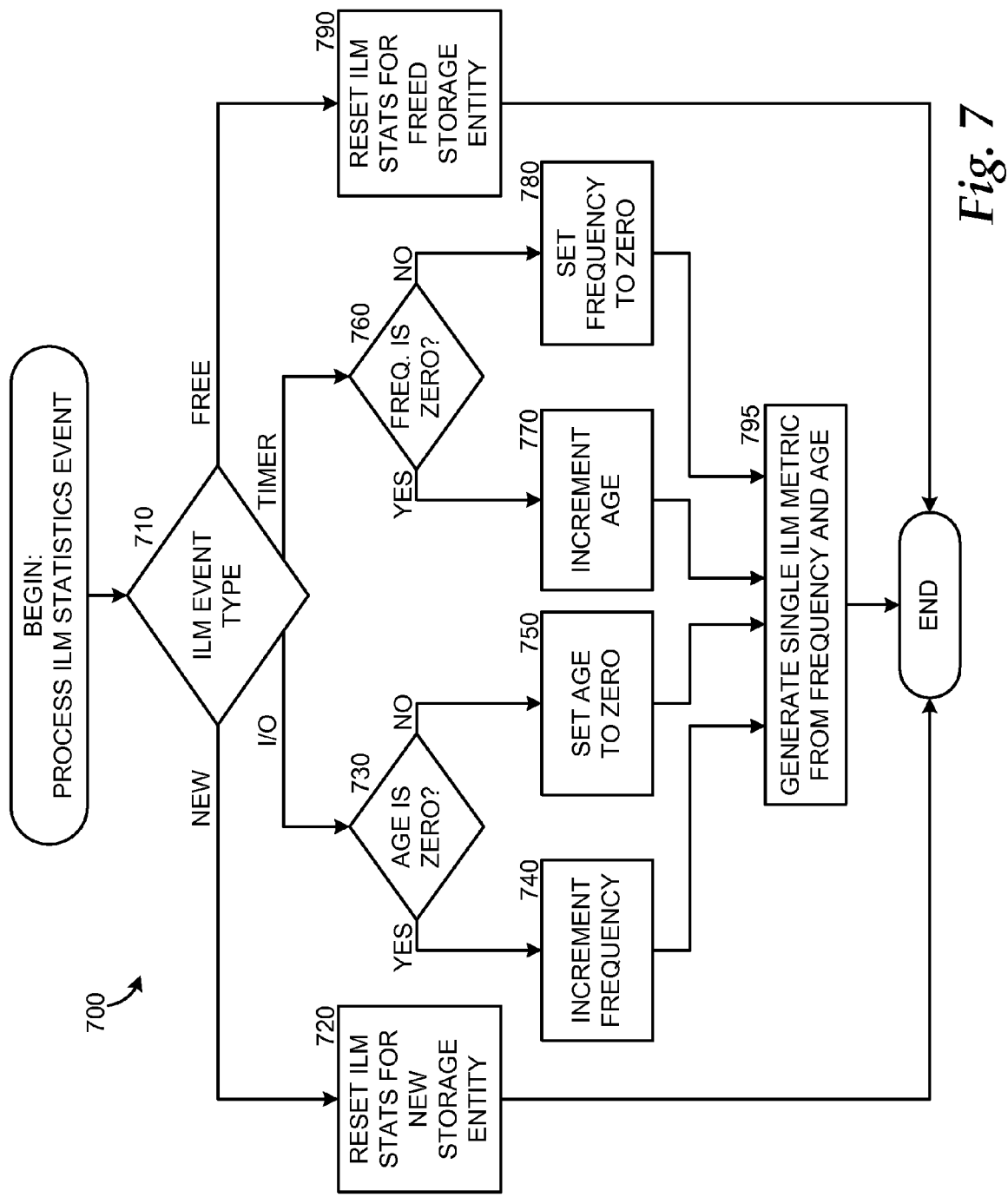
FIG. 7 is a logical flow diagram illustrating a process performed by a storage system for processing an ILM statistics event according to one exemplary embodiment.

Turning now to FIG. 7, additional details will be provided regarding the embodiments presented herein for data migration in a multitier storage system using age and frequency statistics. In particular, FIG. 7 is a flow diagram illustrating a routine 700 that shows aspects of an exemplary process performed by a storage system for processing an ILM statistics event. The routine 700 can begin with operation 710 where it is determined what type of ILM event has occurred. If a new storage entity, or territory, is added to the storage system, the routine 700 can continue from operation 710 to operation 720. If an I/O has occurred requiring the updating of ILM statistics, the routine 700 can continue from operation 710 to operation 730. If the timer for updating ILM statistics has triggered an ILM event, the routine 700 can continue from operation 710 to operation 760. If a storage entity, or territory, has been freed, the routine 700 can continue from operation 710 to operation 790.

At operation 720, the ILM statistics for a new storage entity, or territory, can be initialized to indicate that the territory is not being used. For example, a system using 16 bit ILM statistics may initialize ILM statistics values to 0xFFFF to represent that the territory is not allocated. In reserving the value 0xFFFF for initialization, the value will not be used to indicate an age or frequency.

At operation 730, it is determined if the age of the territory is zero. If the age is zero, the routine 700 can continue to operation 740 where the frequency can be incremented. When an I/O to a territory completes, the age of the territory can be zero and the frequency can be incremented. The frequency can be considered the number of I/Os that have hit that territory in during the last ILM update timer period. There may be a maximum frequency beyond which the frequency is no longer incremented. For example, a system using 16 bit ILM statistics may only increment the frequency to a maximum of 0xFFFE since the ILM statistic value of 0xFFFF may indicate the initialized, unallocated state. If operation 730 instead determines that the age of the territory is not zero, the routine 700 can proceed to operation 750 where the age is set to zero. The age of a territory can be the number of ILM update timer periods since the last I/O within the given territory occurred. An ILM update timer period may be, for example, one hour, or any other time period according to embodiments.

At operation 760, it is determined if the frequency of the territory is zero. If the frequency is zero, the routine 700 can continue to operation 770 where the age can be incremented. When an ILM update timer event occurs, the age of the territory can be incremented and the frequency set to zero. The frequency can be considered the number of I/Os that have hit that territory in during the last ILM update timer period. There may be a maximum age beyond which the age is no longer incremented. For example, a system using 16 bit ILM statistics may only increment the age to a maximum of 0xFFFE since the ILM statistic value of 0xFFFF may indicate the initialized, unallocated state. If operation 760 instead determines that the frequency of the territory is not zero, the routine 700 can proceed to operation 780 where the frequency is set to zero. The age of a territory can be the number of ILM update timer periods since the last I/O within the given territory occurred. An ILM update timer period may be, for example, one hour, or any other time period according to embodiments.

Operation 795 may follow after operations 740, 750, 770, or 780. When the ILM statistics for age, frequency, or both are updated, operation 795 can process the age and frequency statistics together into a single signed value to form an ILM metric. The routine 700 can terminate after operation 795.

At operation 790, the ILM statistics can be reset. When a storage territory is freed or released back to the unused storage pool, the statistics can be reset to the initialized value. For example, a system using 16 bit ILM statistics may reset to the initialized values of 0xFFFF to represent that the territory is no longer allocated. The routine 700 can terminate after operation 790.

Figure 8:
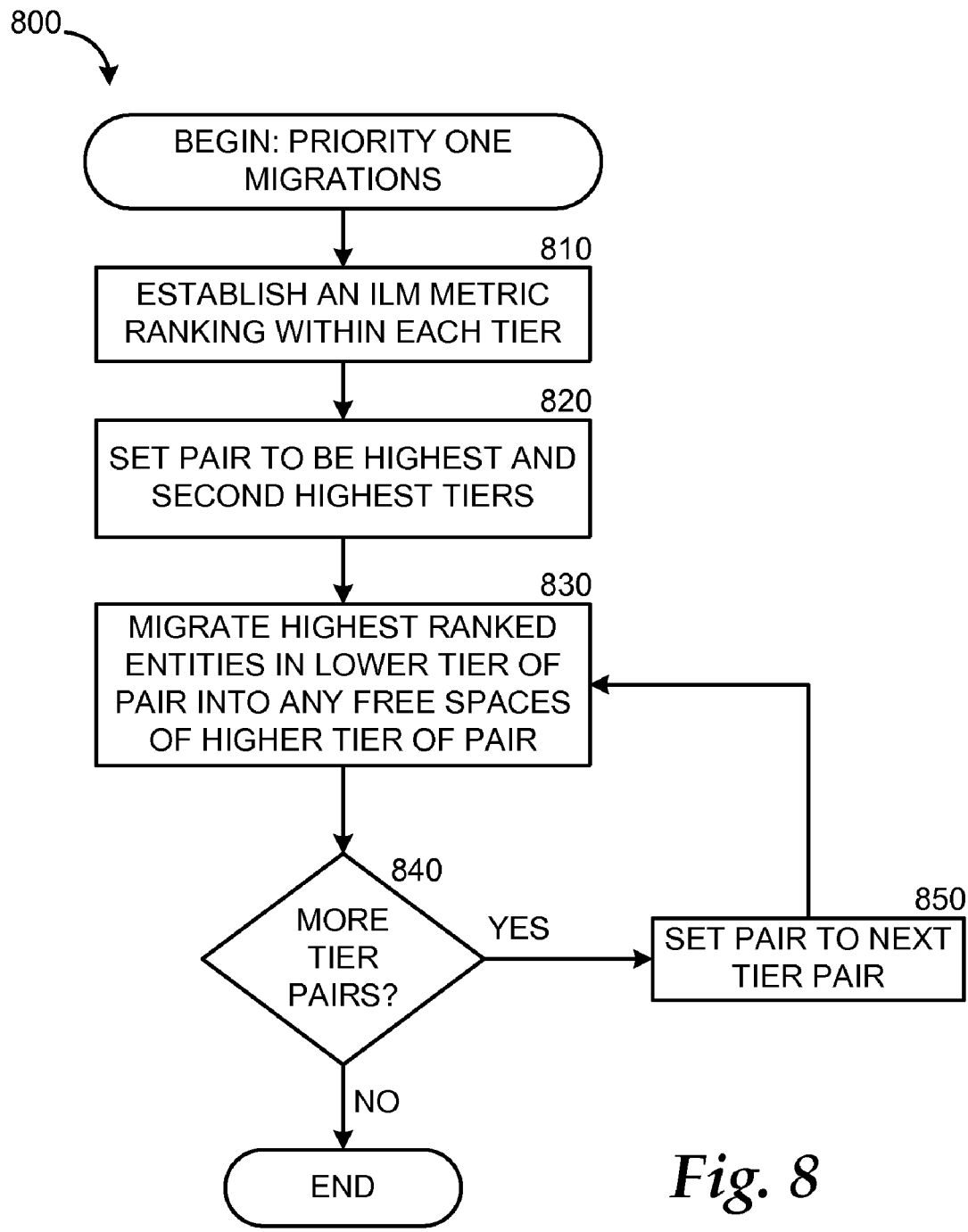
FIG. 8 is a logical flow diagram illustrating a process performed by a storage system for priority one data migrations according to one exemplary embodiment.

Turning now to FIG. 8, additional details will be provided regarding the embodiments presented herein for data migration in a multitier storage system using age and frequency statistics. In particular, FIG. 8 is a flow diagram illustrating a routine 800 that shows aspects of an exemplary process performed by a storage system for performing priority one data migrations. The routine 800 can begin with operation 810 where the territories within each tier are sorted by their ILM metric to provide a ranking of the territories within each tier by ILM metric. This sorting may be used to determine which territories of a given tier are more eligible than territories in the next higher tier or less eligible than the territories in the next lower tier.

At operation 820, a pair of tiers to evaluate is initialized as the two highest tiers within the storage system. At operation 830, the current pair of tiers can be evaluated. This evaluation involves looking at the highest territories in the lower tier to see if any of them have higher ILM metrics than the lowest ILM metric in the higher tier of the pair. If one or more territories in the lower tier meet this criterion, they can be said to be more eligible to be in the higher tier. If there are territories in the lower tier of the pair that are more eligible and the higher tier has open space, the more eligible territories can be migrated from the lower tier of the pair to the high tier of the pair. Such migration to a higher tier can be referred to as promotion.

At operation 840 it can be determined if there are more pairs of neighboring tiers to be evaluated for migration. If there are more tiers, the routine 800 can proceed to operation 850 where the current pair of tiers to evaluate is advanced to the next pair of tiers. This pair advance can include setting the current lower tier to be the new higher tier and setting the tier below the current lower tier to be the new lower tier. From operation 850, the routine 800 can loop back to operation 830 where the newly advanced pair of tiers may be evaluated for possible promotion of more eligible territories as described above. If instead, it is determined at operation 840 that there are no more pairs of tiers to evaluate, the routine 800 can terminate.

Figure 9:
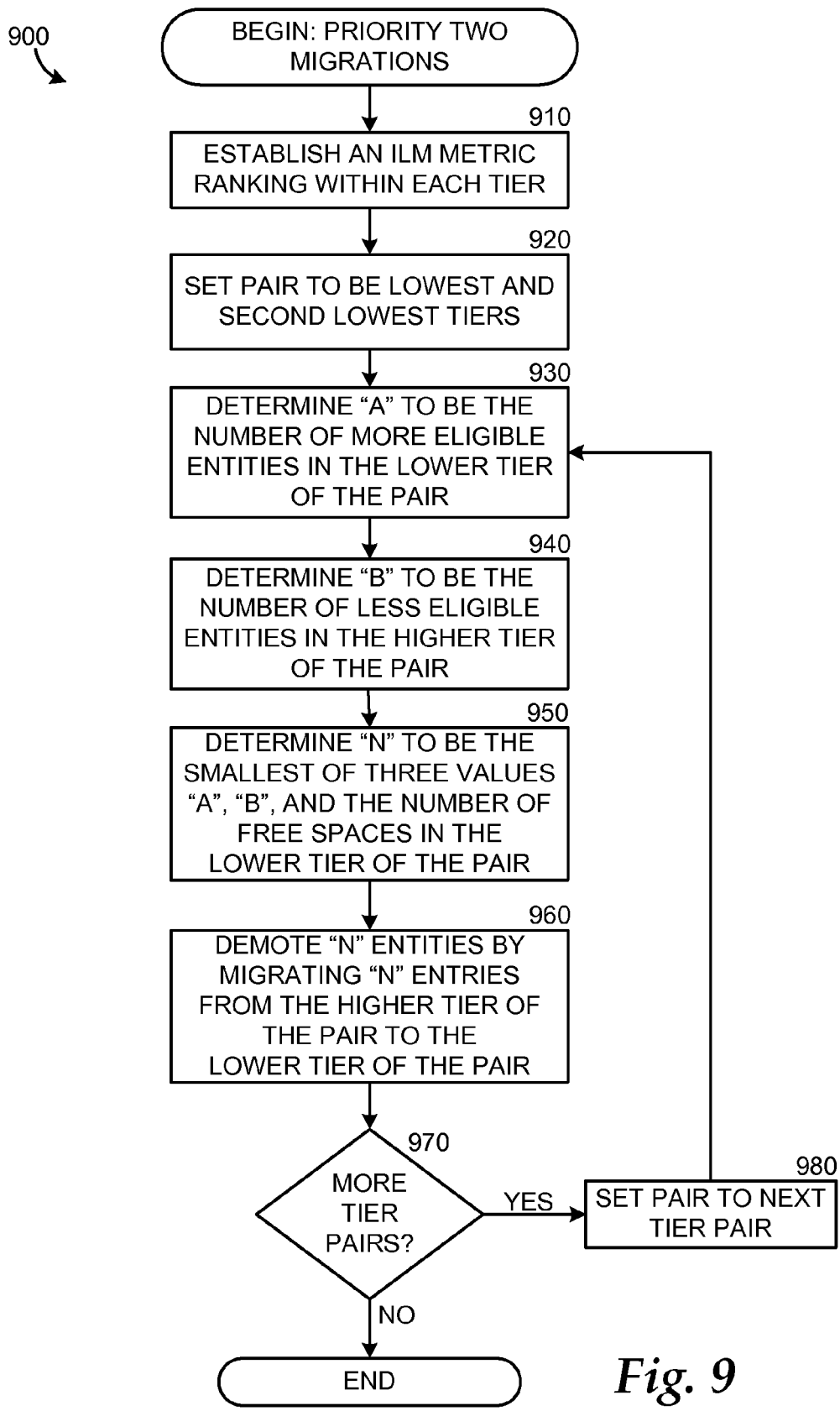
FIG. 9 is a logical flow diagram illustrating a process performed by a storage system for priority two data migrations according to one exemplary embodiment.

Turning now to FIG. 9, additional details will be provided regarding the embodiments presented herein for data migration in a multitier storage system using age and frequency statistics. In particular, FIG. 9 is a flow diagram illustrating a routine 900 that shows aspects of an exemplary process performed by a storage system for performing priority two data migrations. The routine 900 can begin with operation 910 where the territories within each tier are sorted by their ILM metric to provide a ranking of the territories within each tier by ILM metric. This sorting may be used to determine which territories of a given tier are more eligible than territories in the next higher tier or less eligible than the territories in the next lower tier.

At operation 920, a pair of tiers to evaluate is initialized as the two lowest tiers within the storage system. At operation 930, a value "A" is determined as the number of more eligible territories in the lower tier of the pair. The territories may have a higher ILM metric than the lowest ILM metric in the higher tier of the pair. At operation 940, a value "B" is determined as the number of less eligible territories in the higher tier of the pair. At operation 950, the values "A" and "B" can be examined to determine how many of the less eligible territories and more eligible territories match up for exchanging. The lower value of "A" and "B" is the highest number of territories that match up but the migration is also limited by the free space on the lower tier. Thus, a value "N" is determined as the minimum of three values, "A," "B," and the number of free territories in the lower tier of the pair.

At operation 960 a number of "N" territories are demoted from the higher tier of the pair to the lower tier of the pair. These demotions can create space in the higher tier for more eligible territories to be promoted into. Such promotions may occur as priority one migrations made during the next pass through the priority phases of data migration. Of course, the spaces created in the higher tier of the pair by the demotion process may be filled in by new territory allocations since new data is always placed in the highest available tier.

At operation 970 it can be determined if there are more pairs of neighboring tiers to be evaluated for migration. If there are more tiers, the routine 900 can proceed to operation 980 where the current pair of tiers to evaluate is advanced to the next pair of tiers. This pair advance can include setting the current higher tier to be the new lower tier and setting the tier above the current higher tier to be the new higher tier. From operation 980, the routine 900 can loop back to operation 930 where the newly advanced pair of tiers may be evaluated for possible demotion of territories as described above. If instead, it is determined at operation 970 that there are no more pairs of tiers to evaluate, the routine 900 can terminate.

Figure 10:
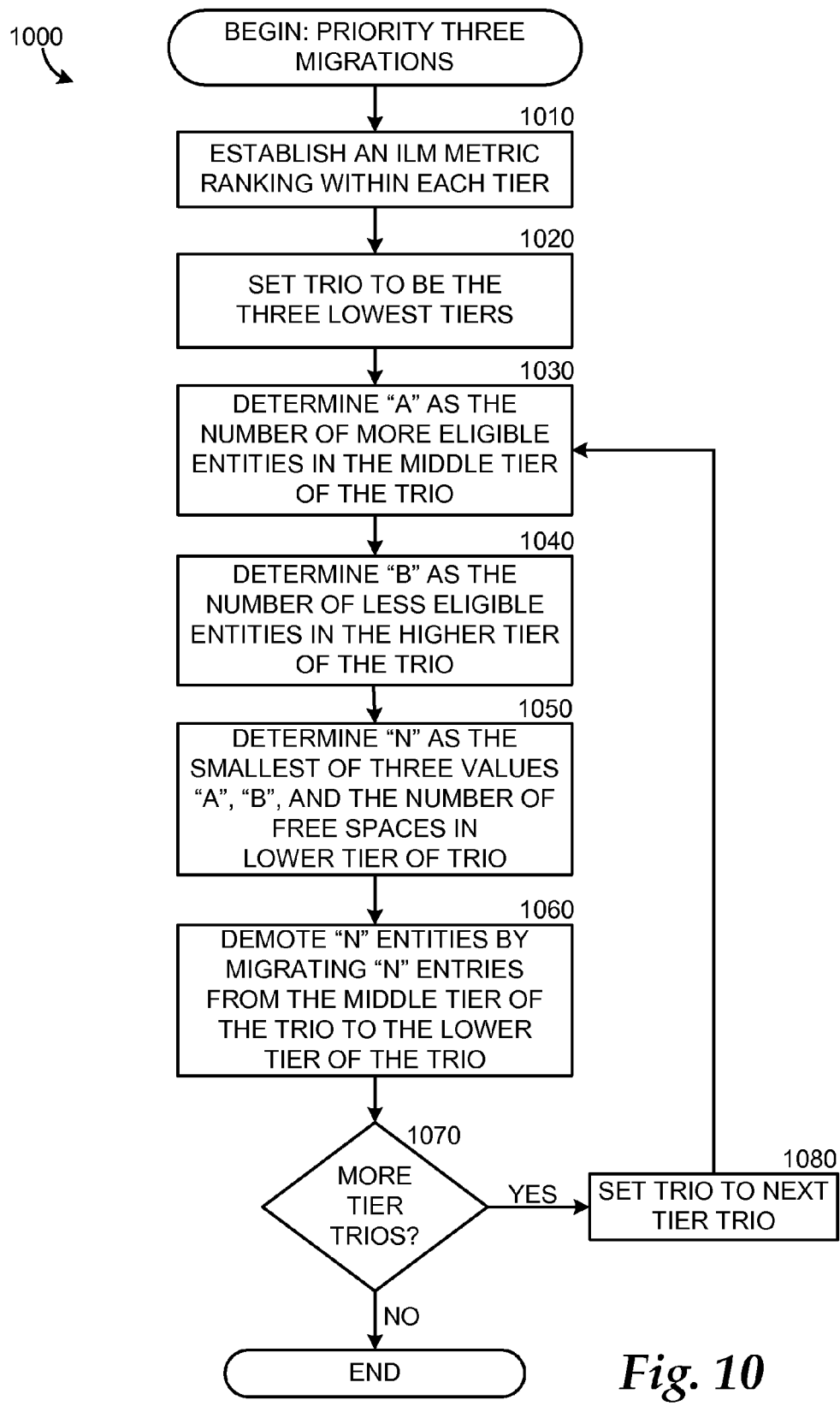
FIG. 10 is a logical flow diagram illustrating a process performed by a storage system for priority three data migrations according to one exemplary embodiment.

Turning now to FIG. 10, additional details will be provided regarding the embodiments presented herein for data migration in a multitier storage system using age and frequency statistics. In particular, FIG. 10 is a flow diagram illustrating a routine 1000 that shows aspects of an exemplary process performed by a storage system for performing priority three data migrations. The routine 1000 can begin with operation 1010 where the territories within each tier are sorted by their ILM metric to provide a ranking of the territories within each tier by ILM metric. This sorting may be used to determine which territories of a given tier are more eligible than territories in the next higher tier or less eligible than the territories in the next lower tier.

At operation 1020, a trio of tiers to evaluate is initialized as the three lowest tiers within the storage system. At operation 1030, a value "A" is determined as the number of more eligible territories in the middle tier of the trio. The territories may have a higher ILM metric than the lowest ILM metric in the higher tier of the trio. At operation 1040, a value "B" is determined as the number of less eligible territories in the higher tier of the trio. At operation 1050, the values "A" and "B" can be examined to determine how many of the less eligible territories and more eligible territories match up and thus would have been exchanged in priority two migration had it not been for a limitation of space in the middle tier of the trio. The lower value of "A" and "B" is the highest number of territories that match up but the migration is also limited by the free space on the lower tier of the trio. Thus, a value "N" is determined as the minimum of three values, "A," "B," and the number of free territories in the lower tier of the trio.

At operation 1060, a number of "N" territories are demoted from the middle tier of the trio to the lower tier of the trio. These demotions can create space in the middle tier for priority two exchanges to take place. Such exchanges may occur as priority two data migrations made during the next pass through the priority phases of data migration.

At operation 1070 it can be determined if there are more trios of neighboring tiers to be evaluated for migration. If there are more tiers, the routine 1000 can proceed to operation 1080 where the current trio of tiers to evaluate is advanced to the next trio of tiers. This trio advance can include setting the current higher tier to be the new middle tier, setting the tier above the current higher tier to be the new higher tier, and setting the current middle tier to be the new lower tier. From operation 1080, the routine 1000 can loop back to operation 1030 where the newly advanced trio of tiers may be evaluated for possible demotions as described above. If instead, it is determined at operation 1070 that there are no more trios of tiers to evaluate, the routine 1000 can terminate.

Figure 11:
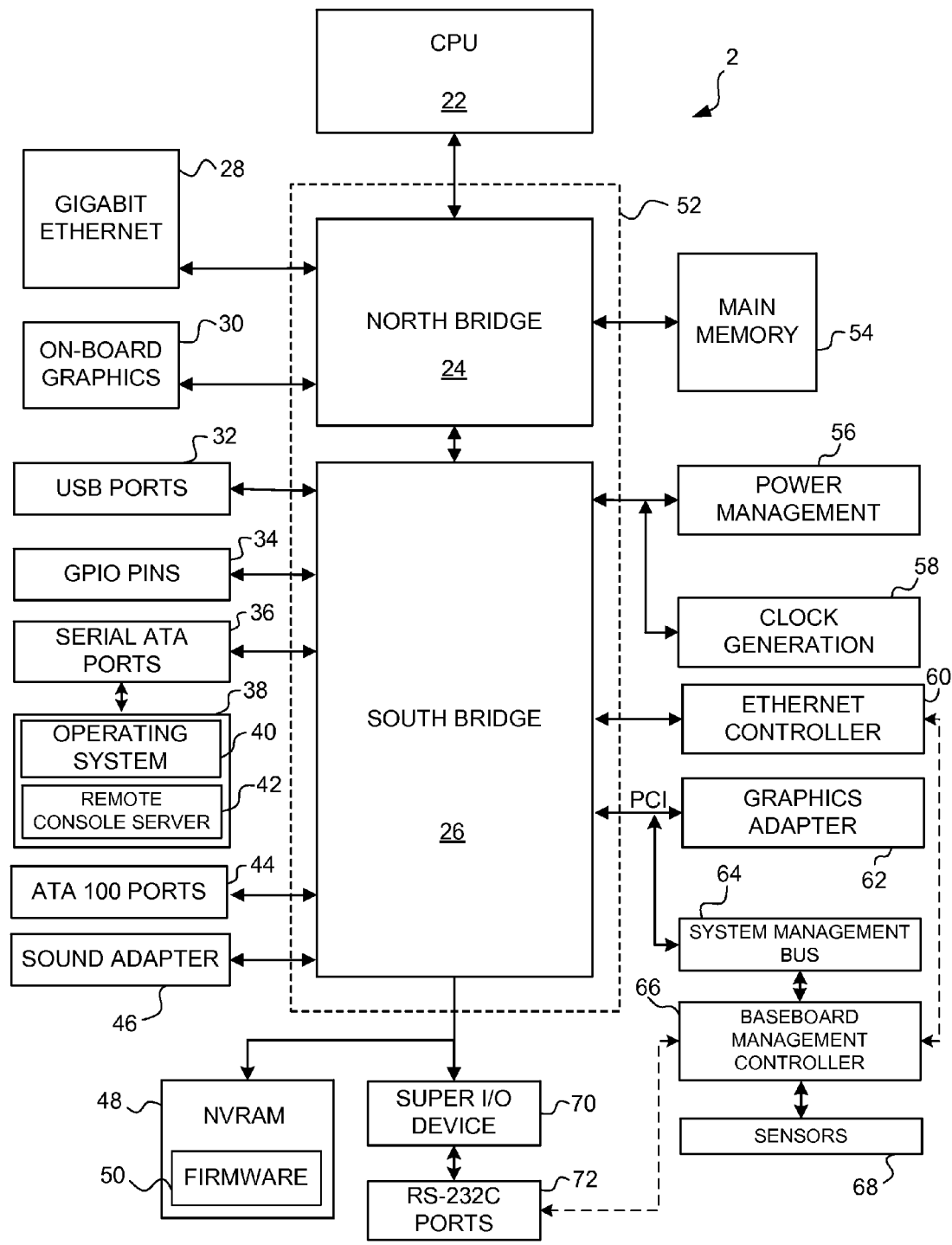
FIG. 11 is a computer architecture diagram illustrating a computer hardware architecture for a computing system capable of serving as a storage node according to one exemplary embodiment.

FIG. 11 and the following discussion are intended to provide a brief, general description of a suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

In particular, FIG. 11 shows an illustrative computer architecture for a storage node computer 2 that may be utilized in the implementations described herein. The storage node computer 2 includes a baseboard, or "motherboard", which is a printed circuit board to which a multitude of components or devices may be connected by way of a system bus or other electrical communication paths. In one illustrative embodiment, a CPU 22 operates in conjunction with a chipset 52. The CPU 22 is a standard central processor that performs arithmetic and logical operations necessary for the operation of the computer. The storage node computer 2 may include a multitude of CPUs 22.

The chipset 52 includes a north bridge 24 and a south bridge 26. The north bridge 24 provides an interface between the CPU 22 and the remainder of the computer 2. The north bridge 24 also provides an interface to a random access memory ("RAM") used as the main memory 54 in the computer 2 and, possibly, to an on-board graphics adapter 30. The north bridge 24 may also include functionality for providing networking functionality through a gigabit Ethernet adapter 28. The gigabit Ethernet adapter 28 is capable of connecting the computer 2 to another computer via a network. Connections which may be made by the network adapter 28 may include LAN or WAN connections. LAN and WAN networking environments are commonplace in offices, enterprise-wide computer networks, intranets, and the internet. The north bridge 24 is connected to the south bridge 26.

The south bridge 26 is responsible for controlling many of the input/output functions of the computer 2. In particular, the south bridge 26 may provide one or more universal serial bus ("USB") ports 32, a sound adapter 46, an Ethernet controller 60, and one or more general purpose input/output ("GPIO") pins 34. The south bridge 26 may also provide a bus for interfacing peripheral card devices such as a graphics adapter 62. In one embodiment, the bus comprises a peripheral component interconnect ("PCI") bus. The south bridge 26 may also provide a system management bus 64 for use in managing the various components of the computer 2. Additional details regarding the operation of the system management bus 64 and its connected components are provided below.

The south bridge 26 is also operative to provide one or more interfaces for connecting mass storage devices to the computer 2. For instance, according to an embodiment, the south bridge 26 includes a serial advanced technology attachment ("SATA") adapter for providing one or more serial ATA ports 36 and an ATA 100 adapter for providing one or more ATA 100 ports 44. The serial ATA ports 36 and the ATA 100 ports 44 may be, in turn, connected to one or more mass storage devices storing an operating system 40 and application programs, such as the SATA disk drive 38. As known to those skilled in the art, an operating system 40 comprises a set of programs that control operations of a computer and allocation of resources. An application program is software that runs on top of the operating system software, or other runtime environment, and uses computer resources to perform application specific tasks desired by the user.

According to one embodiment of the invention, the operating system 40 comprises the LINUX operating system. According to another embodiment of the invention the operating system 40 comprises the WINDOWS SERVER operating system from MICROSOFT CORPORATION. According to another embodiment, the operating system 40 comprises the UNIX or SOLARIS operating system. It should be appreciated that other operating systems may also be utilized.

The mass storage devices connected to the south bridge 26, and their associated computer-readable media, provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 6 for connecting a "Super I/O" device 70. The Super I/O device 70 is responsible for providing a number of input/output ports, including a keyboard port, a mouse port, a serial interface 72, a parallel port, and other types of input/output ports. The LPC interface may also connect a computer storage media such as a ROM or a flash memory such as a NVRAM 48 for storing the firmware 50 that includes program code containing the basic routines that help to start up the computer 2 and to transfer information between elements within the computer 2.

As described briefly above, the south bridge 26 may include a system management bus 64. The system management bus 64 may include a BMC 66. In general, the BMC 66 is a microcontroller that monitors operation of the computer system 2. In a more specific embodiment, the BMC 66 monitors health-related aspects associated with the computer system 2, such as, but not limited to, the temperature of one or more components of the computer system 2, speed of rotational components (e.g., spindle motor, CPU Fan, etc.) within the system, the voltage across or applied to one or more components within the system 2, and the available or used capacity of memory devices within the system 2. To accomplish these monitoring functions, the BMC 66 is communicatively connected to one or more components by way of the management bus 64. In an embodiment, these components include sensor devices for measuring various operating and performance-related parameters within the computer system 2. The sensor devices may be either hardware or software based components configured or programmed to measure or detect one or more of the various operating and performance-related parameters. The BMC 66 functions as the master on the management bus 64 in most circumstances, but may also function as either a master or a slave in other circumstances. Each of the various components communicatively connected to the BMC 66 by way of the management bus 64 is addressed using a slave address. The management bus 64 is used by the BMC 66 to request and/or receive various operating and performance-related parameters from one or more components, which are also communicatively connected to the management bus 64.

It should be appreciated that the computer 2 may comprise other types of computing devices, including hand-held computers, embedded computer systems, personal digital assistants, and other types of computing devices known to those skilled in the art. It is also contemplated that the computer 2 may not include all of the components shown in FIG. 11, may include other components that are not explicitly shown in FIG. 11, or may utilize an architecture completely different than that shown in FIG. 11.

Based on the foregoing, it should be appreciated that technologies for implementing a migration mechanism in a storage system containing multiple tiers of storage with each tier having different cost and performance parameters are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for migrating data between tiers of a storage system, when the method is executed by a computer system, the method comprising:
    subdividing a storage capacity of the storage system into a set of territories;
    partitioning the set of territories into tiers;
    imposing an ordering on the tiers;
    maintaining an information lifecycle management metric for each territory;
    promoting a territory that is more eligible into a highest possible tier in response to storage capacity being available in a higher tier;
    demoting a territory that is less eligible into a lower tier in response to a more eligible territory existing in the lower tier and no storage capacity being available for promotion of the more eligible territory; and
    demoting a least eligible territory to a next lowest tier in response to a less eligible territory existing in the next highest tier and no storage capacity being available for demotion of the less eligible territory,
    wherein maintaining an information lifecycle management metric comprises combining an age statistic and a frequency statistic into a single metric, wherein the information lifecycle management metric is updated once per update period, wherein each update period has a consistent amount of time, and wherein a sign bit of the single metric is set or cleared in response to the single metric storing the frequency statistic and the age statistic.

2. The method of claim 1, wherein imposing an ordering on the tiers comprises ordering each one of the tiers higher in response to the respective tier having higher performance characteristics.

3. The method of claim 1, further comprising providing a periodic timer for scheduling of data migration.

4. The method of claim 1, further comprising providing a periodic timer for updating information lifecycle management metrics.

5. The method of claim 4, further comprising incrementing an age statistic associated with each territory in response to the periodic timer for updating information lifecycle management metrics.

6. The method of claim 1, further comprising sorting the territories within each tier in order of the information lifecycle management metric associated with each respective territory.

7. A computer storage medium having computer-executable instructions stored thereon which, when executed by a computer system, cause the computer system to:
- subdivide a storage capacity of a storage system into a set of territories;
- partition the set of territories into ordered tiers;
- promote a territory that is more eligible into a highest possible tier in response to storage capacity being available in a higher tier;
- demote a territory that is less eligible into a lower tier in response to a more eligible territory existing in the lower tier and no storage capacity being available for promotion of the more eligible territory;
- demote a least eligible territory to a next lowest tier in response to a less eligible territory existing in the next highest tier and no storage capacity being available for demotion of the less eligible territory; and
- causing the computer system to maintain an information lifecycle management metric combining an age statistic and a frequency statistic into a single metric, wherein the information lifecycle management metric is updated once per update period, wherein each update period has a consistent amount of time, and wherein a sign bit of the single metric is set or cleared in response to the single metric storing the frequency statistic and the age statistic.

8. The computer storage medium of claim 7, further causing the computer system to impose an ordering on the tiers by ordering each one of the tiers higher in response to the respective tier having higher performance characteristics.

9. The computer storage medium of claim 7, further causing the computer system to provide a periodic timer for scheduling of data migration.

10. The computer storage medium of claim 7, further causing the computer system to provide a periodic timer for updating information lifecycle management statistics.

11. The computer storage medium of claim 10, further causing the computer system to increment an age statistic when a frequency statistic equals zero in response to the periodic timer for updating information lifecycle management statistics.

12. The computer storage medium of claim 7, further causing the computer system to sort the territories within each tier in order of information lifecycle management statistics associated with each respective territory.

13. A data storage system comprising:
- a storage subsystem;
- a plurality of physical storage devices associated with the storage subsystem; and
- one or more data migration modules operable to cause the storage subsystem to:
- subdivide a storage capacity of the storage system into a set of territories;
- partition the set of territories into tiers;
- promote a territory that is more eligible into a highest possible tier in response to storage capacity being available in a higher tier;
- demote a territory that is less eligible into a lower tier in response to a more eligible territory existing in the lower tier and no storage capacity being available for promotion of the more eligible territory;
- demote a least eligible territory to a next lowest tier in response to a less eligible territory existing in the next highest tier and no storage capacity being available for demotion of the less eligible territory; and
- causing the computer system to maintain an information lifecycle management metric combining an age statistic and a frequency statistic into a single metric, wherein the information lifecycle management metric is updated once per update period, wherein each update period has a consistent amount of time, and wherein a sign bit of the single metric is set or cleared in response to the single metric storing the frequency statistic and the age statistic.

14. The data storage system of claim 13, wherein the data migration modules are further operable to provide a periodic timer for scheduling of data migration.

15. The data storage system of claim 13, wherein the data migration modules are further operable to provide a periodic timer for updating information lifecycle management statistics.

16. The data storage system of claim 15, wherein the data migration modules are further operable to increment an age statistic associated with each territory in response to the periodic timer for updating information lifecycle management metrics.

* * * * *